Jan. 17, 1950  A. E. LINES  2,494,567
TRAP SETTING DEVICE

Filed July 12, 1946  3 Sheets-Sheet 1

INVENTOR.
Arthur E. Lines
BY Victor J. Evans & Co.
ATTORNEYS

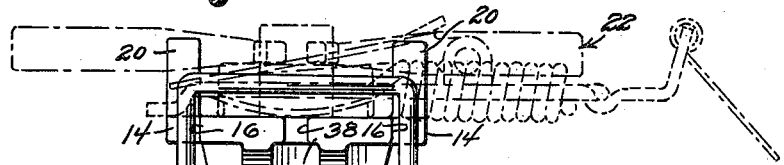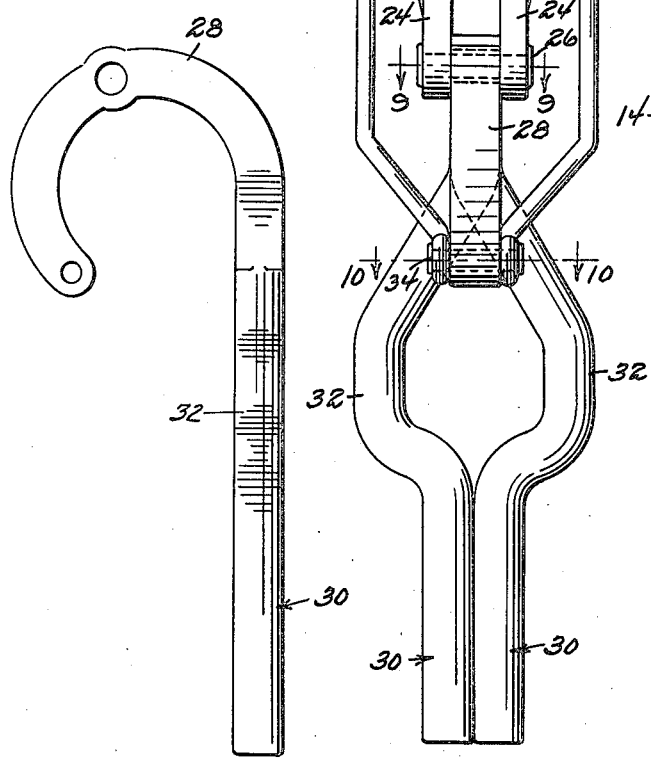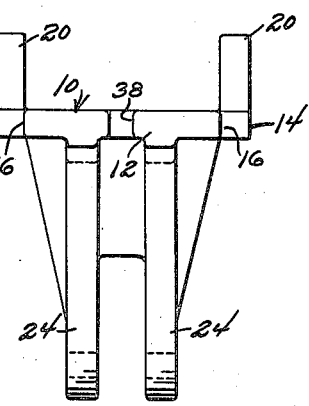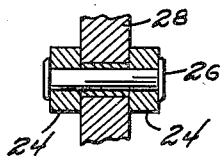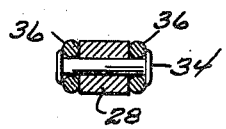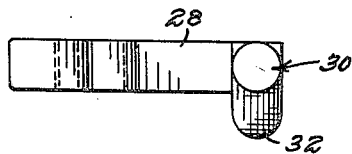
INVENTOR.
Arthur E. Lines
BY Victor J. Evans & Co.
ATTORNEYS

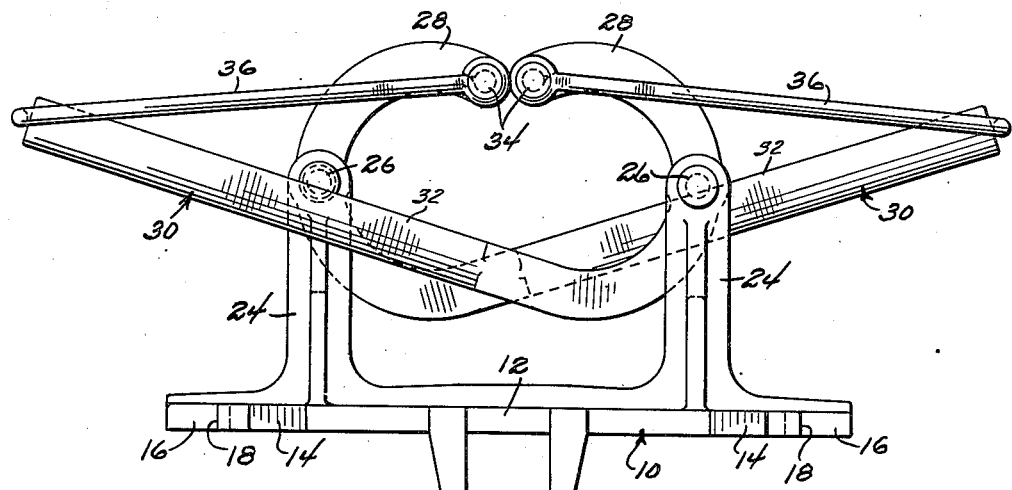
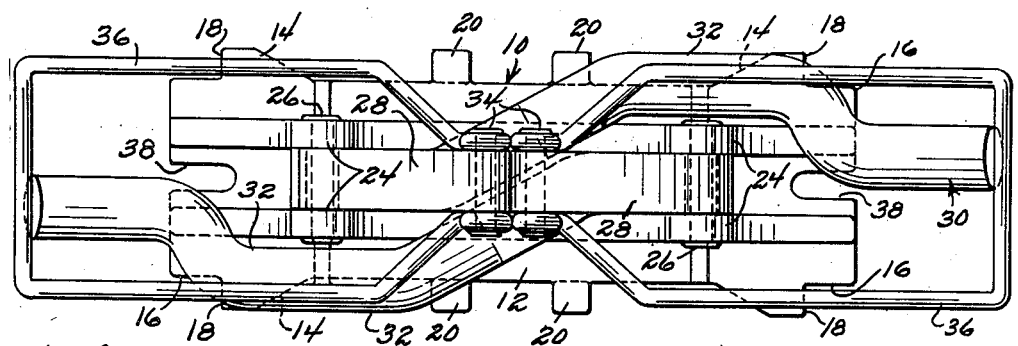
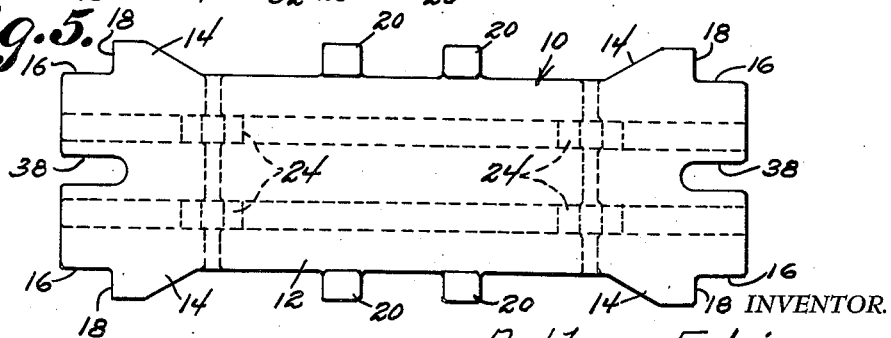

Patented Jan. 17, 1950

2,494,567

UNITED STATES PATENT OFFICE 2,494,567

TRAP SETTING DEVICE

Arthur E. Lines, Farmersville Station, N. Y.

Application July 12, 1946, Serial No. 683,081

1 Claim. (Cl. 43—97)

This invention relates to a trap setting device, which is designed for use with spring jawed animal traps, similar to the trap disclosed in Patent 2,247,632.

An object of the invention is to provide a trap setting device that will efficiently set a trap without using the old method of standing on the jaws of the trap during the setting thereof.

With the old method, the ground is so covered with foot prints that the animals usually shy clear of the trap, but with the use of this particular device, the trap can be set without marking the ground adjacent the trap.

With the above and other objects and advantages in view, the invention consists of the novel details of construction, arrangement and combination of parts more fully hereinafter described, claimed and illustrated in the accompanying drawings in which:

Figure 1 is an elevational view of an embodiment of the invention in operation with a coil spring trap of the type previously referred to;

Figure 2 is an end view thereof;

Figure 3 is an inverted side view of the invention per se;

Figure 4 is a top view of Figure 3;

Figure 5 is an elevational plan view of the base plate;

Figure 6 is an elevational view of one of the operating levers;

Figure 7 is a bottom view of Figure 6;

Figure 8 is an end view of Figure 5;

Figure 9 is a sectional view on the line 9—9 of Figure 2 and

Figure 10 is a sectional view on the line 10—10 of Figure 2.

Figure 1:
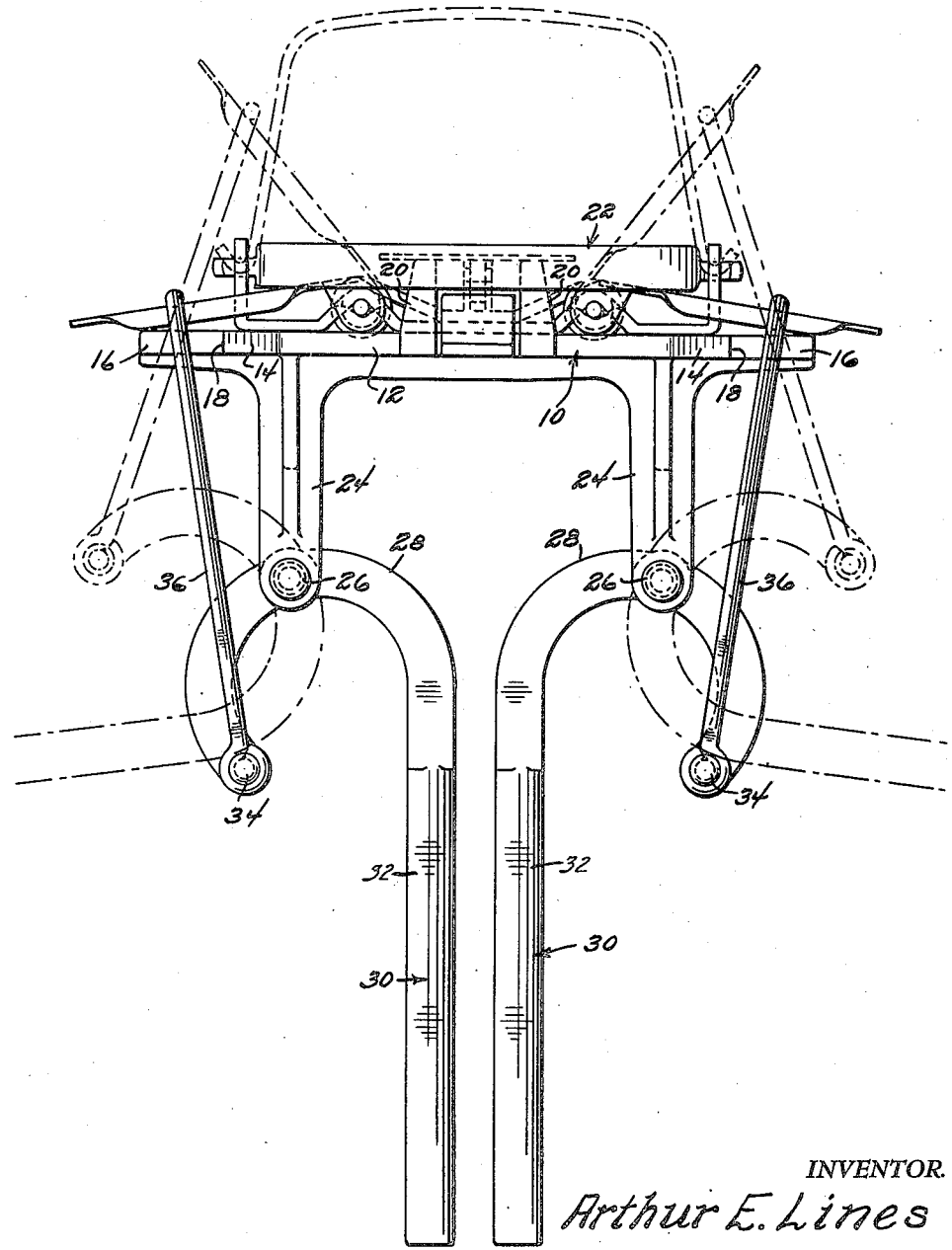

Referring more in detail to the drawings the reference numeral 10 designates the base plate of the trap setting device, having the rectangular shaped central portion 12 and the tapered end portions 14 at each end thereof.

The end portions 14 are recessed at 16 at opposite edges thereof for a purpose to be later described, and these recesses form stops or shoulders 18.

Formed on the longitudinal opposite edges of the portion 12 are the upstanding relatively spaced arms 20 which are spaced to position the trap 22 on the base plate 10 for setting thereof.

Depending from and formed integral with the undersurface of the plate 10 are the diametrically opposed and relatively spaced pairs of legs 24 which are apertured at their lower ends to receive a pivot pin 26 on which are pivotally mounted, the curved end portions 28 of the operating levers 30 which have the offset portions 32 which are provided for clearance of the ends of the levers 30 during the operation thereof, as best seen in Fig. 2.

pivot pins 34 which pivotally mount the substantially U-shaped spring setting wire frames 36 and these frames are adapted to engage in the recesses 16 of the base 10 and abut the stop or shoulders 18 during the setting of the trap.

Since some traps have heavy chains, slots 38 are provided in base 10 to receive part of the links thereof, so that the chains will not interfere with the operation of the device.

In operation of the device, the base plate 10 is grasped by the left hand intermediately of the depending legs 24. Then with the right hand the trap is positioned on the base plate as shown in Figure 1, the frames are inserted over the spring actuators of the trap, their forward movement being limited by the stops 18 so that the frames will not engage the coil spring of the trap, the levers 30 are drawn downwardly to the position shown in Figure 1 by both the right and left hand and then with the right hand holding the levers 30 the trigger is set. Then, with release of the levers 30 by the right hand, the device may be removed from the trap, and the trap placed in the desired location.

There has thus been provided a trap setting device which will, it is believed, accomplish the objects of the invention, and from the foregoing description, it will be apparent how the invention operates. It is also to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A device of the character described, for setting animal traps, comprising a base plate, means on said base plate for retaining a trap thereon, mounting means depending from said base plate, a plurality of operating levers, said levers being provided with a curved end, a straight end and an offset portion intermediate the ends, and trap setting frames mounted on the ends of the curved ends of the levers for setting the trap, the levers being pivoted at the central portion of the said curved ends on said mounting means.

ARTHUR E. LINES.

REFERENCES CITED

The following references are of record in the file of this patent:

UNITED STATES PATENTS

| Number | Name | Date |
|---|---|---|
| 606,566 | Luye | June 28, 1898 |
| 898,731 | Ellis | Sept. 15, 1908 |
| 1,145,789 | Olson | July 6, 1915 |
| 1,358,141 | Files | Nov. 9, 1920 |